June 17, 1952  C. O. STROM  2,600,703
PRESSURE COOKER
Filed May 18, 1946  2 SHEETS—SHEET 1
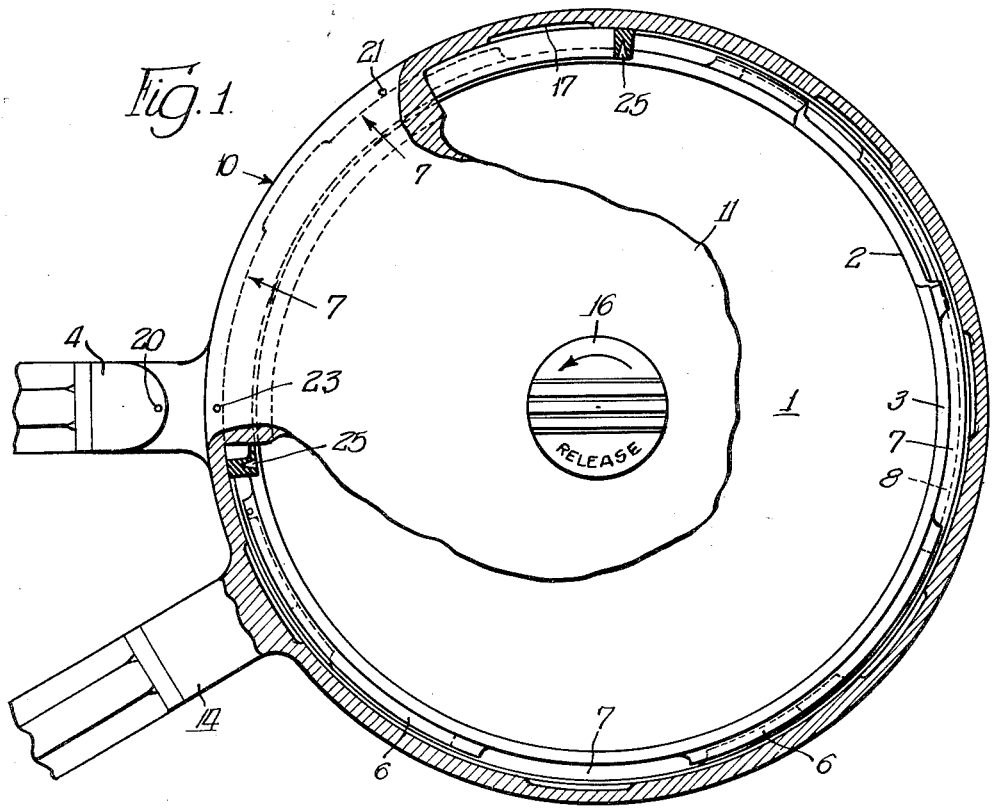
INVENTOR.
Clifton O. Strom,
BY George H. Simmons
ATTY.

June 17, 1952  C. O. STROM  2,600,703
PRESSURE COOKER
Filed May 18, 1946  2 SHEETS—SHEET 2
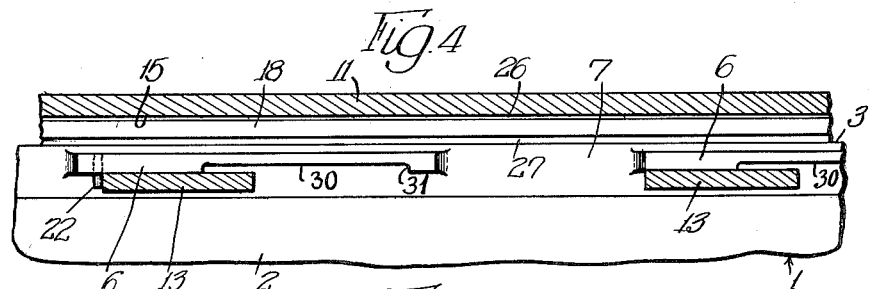
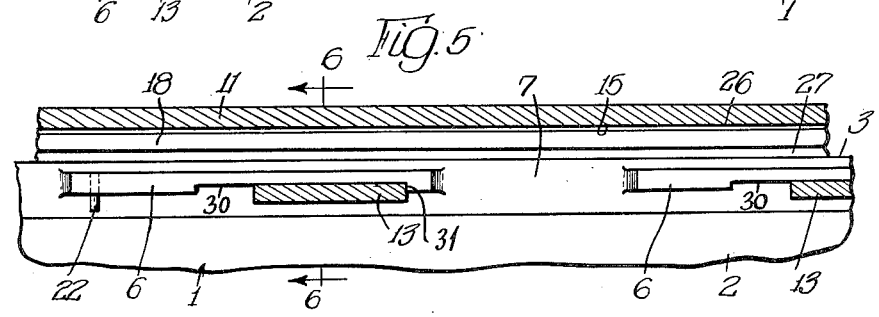
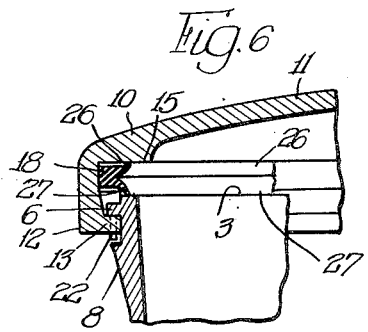
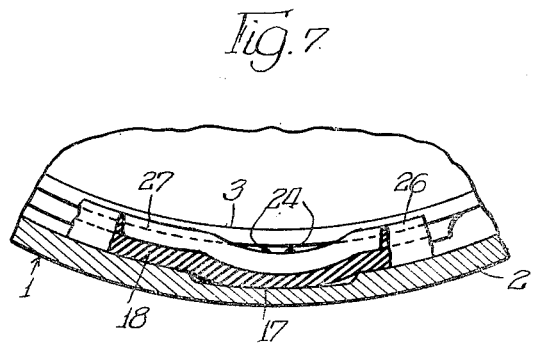
INVENTOR.
Clifton O. Strom,
BY George H. Simmons
Atty.

Patented June 17, 1952

2,600,703

UNITED STATES PATENT OFFICE 2,600,703

PRESSURE COOKER

Clifton O. Strom, Racine, Wis., assignor, by mesne assignments, to Speed-Meal Corporation, Racine, Wis., a corporation of Delaware Application May 18, 1946, Serial No. 670,772

1 Claim. (Cl. 220—40)

This invention relates to pressure cookers for domestic use and has for its principal object the provision of a new and improved cooker of this type.

It is a main object of the invention to provide a domestic type pressure cooker in which the cover is positively locked on the cooker at all times when there is pressure in the cooker to make cooker safe even when used by an inexperienced housewife.

A further object of the invention is to provide a pressure cooker in which a self-sealing gasket is employed and in which the gasket functions also as an emergency release in cases where abnormal pressures are built up in the cooker.

Still another object of the invention is to provide a locking means for securing the cover on the cooker by which the cover is locked in place prior to sealing the cooker against normal operating pressure and in which an auxiliary lock is provided to prevent removal of the cover when there is a small pressure remaining in the cooker.

Still another object of the invention is to provide a domestic type that is of simple construction that can be cleaned easily and can be manufactured at low cost without sacrificing quality.

Further objects of the invention not specifically mentioned here will be apparent from the detailed description and claims which follow, reference being had to the accompanying drawings in which a preferred embodiment of the invention is shown by way of example, and in which:

Figure 1 is a plan view of a cooker and cover, partly in section and showing the invention;

Figure 2 is a fragmentary elevational view, partly in section, showing the cover in its initial position;

Figure 3 is a view similar to Figure 2 showing the cover in locked position and before pressure is built up in the cooker;

Figure 4 is a view similar to Figure 3 with the cooker under normal pressure;

Figure 5 is a view similar to Figure 2 showing the cover in intermediate locking position;

Figure 6 is a cross-sectional view taken substantially along the line 6—6 of Figure 5 looking in the direction of the arrows; and Figure 7 is a fragmentary cross-sectional view taken substantially along the plane 7—7 of Figure 1 looking down and showing the gasket releasing abnormal pressure in the cooker.

Domestic type pressure cookers usually consist of a main cooker body and a cover, both of which are provided with sealing surfaces against which a gasket bears to seal the vessel pressure tight. Frequently the body of the cooker is provided with ribs that project radially outwardly near the sealing surface and are adapted to receive lugs that project radially inwardly from a flange on the cover to lock the cover in place on the cooker. In the prior art of which I am aware some of these ribs and lugs have had engaging surfaces disposed at an angle with respect to the sealing surface thereby to draw the cover down tight on the gasket as it is rotated into locking position.

It is possible to form a pressure tight seal by compressing a flexible gasket only when that gasket is in perfect condition and the sealing surfaces on the cooker and cover are likewise in perfect condition. Gaskets which are compressed by movement of the cover over a camming surface are subjected to excessive wear and soon become incapable of forming a pressure tight seal. The present invention provides for locking the cover on the cooker without compressing the gasket and provides for forming a preliminary seal of the cooker only by the weight of the cover. This permits building up in the cooker a small initial pressure which elevates the cover slightly to complete the locking of the cover. The gasket employed is expanded by pressure in the cooker to seal it against normal working pressure. Since the gasket is not subject to strains during locking of the cover it is capable of maintaining a pressure tight seal for a longer period of time than have the gaskets of the prior art.

Pressure cookers are also usually provided with safety valves by which the amount of pressure generated in the cooker is regulated, which valves may also include pressure release devices so that the pressure in the cooker may be reduced to zero at will. In manipulating a cooker of this type the housewife is supposed to let the pressure out of the cooker before unlocking the cover; however this is not always done and when the cover is unlocked with pressure in the cooker, the cover will be blown off with considerable force and may damage the walls and ceiling of the kitchen and may also injure the housewife. The present invention provides a cooker that is safe by providing an improved locking arrangement which positively locks the cover on the cooker so long as any pressure remains in the cooker.

Safety valves for cookers of this type usually consist of either a weighted or spring-pressed sealing member that seats on a seating surface surrounding a rather small orifice in the cooker cover. An arrangement of this type, while it is satisfactory in most instances, may become clogged with particles of food with the result that the safety valve does not permit the escape of excess pressure and dangerous pressures may be built up within the cooker. To guard against contingencies of this kind, prior art cookers of which I am aware have usually been provided with blow out plugs usually composed of a synthetic rubber and designed to relieve excess pressure in the cooker. These arrangements have not been altogether satisfactory, particularly since when the plug blows the pressure is allowed to escape through a relatively small opening and juices and food particles are blown upwardly through this opening and may damage the walls and ceiling of the kitchen and injure the housewife.

The present invention provides a gasket which is not only self-sealing under normal operating conditions in the cooker but which serves also as an emergency release for excess pressures, directing the juices and particles of food that may be blown out of the cooker downwardly alongside of the outer surface of the cooker.

Referring now to the drawings in more detail, particularly Figures 1 and 6, in the embodiment shown the cooker consists of a main generally cylindrical body 1 having side walls 2 that are provided with a flat sealing surface 3 extending around the top edge of the cooker. The cooker is also provided with a handle 4 by which it may be carried to and from the stove. Projecting radially outwardly from the outer surface of the wall 2 of the cooker are a plurality of ribs 6 spaced apart to form passageways 7 that are uniformly spaced around the cooker. Side walls 2 may also contain an outwardly extending bead 8 disposed below the ribs 6 to give the cooker a more pleasing appearance.

The cover 10 comprises a main generally circular portion 11 which may be arcuate in shape to provide a dome on the cooker. Depending below the cover 10 is a flange 12 which fits down outside of the ribs 6 and extends into juxtaposition with the bead 8. Projecting radially inwardly from the flange 12 are a plurality of lugs 13 which are spaced around the flange and are of such dimension that they will pass readily through the passageways 7 as the cover is lowered onto the cooker. The cover is also provided with a handle 14 and while the position of this handle relative to the position of handle 4 when the cover is locked in place on the cooker, as will presently appear, is not of the essence of the present invention, preferably it is so located on the cover that it will be disposed at an angle to the handle 4 as shown in Figure 1 for a purpose more fully explained in the co-pending application of Carl Nelson, Serial No. 580,755, filed March 3, 1945, now Patent No. 2,513,350.

Located within the cover 10 is a flat sealing surface 15 which extends around the cover inside of the flange and is disposed parallel to the sealing surface 3 on the cooker when the cover is locked in place thereon. The cover is also provided with a safety valve 16 preferably of the type more fully explained in the above mentioned co-pending application of Nelson.

Flange 12 of the cover is provided with a plurality of recesses 17 that are uniformly spaced around the flange for a purpose which will hereinafter appear. A gasket 18 is fitted in the cover and against the sealing surface 15 therein, extending into engagement with the flange 12. This gasket bridges across the recesses 17, as will presently appear. The gasket is of such dimension that it will be held in the cover by its fractional engagement with the flange and since it is located between the sealing surface 15 and the lugs 13 it will be prevented from falling out of the cover by the lugs.

When it is desired to put the cover on the cooker, handles 4 and 14 are spread so as to bring the lugs 13 into registration with the passageways 7. To aid the housewife in so locating the cover with respect to the cooker, the cooker is provided with a marking point 20, which may conveniently be a brightly colored dot, and the cover is provided with a similarly colored dot or point 21 so located that the lugs 13 will be registered with the passageways 7 when dots 20 and 21 are adjacent to each other. The cover is then lowered on to the cooker to bring the gasket 18 down on to the sealing surface 3 as shown in Figure 2. The cover is then rotated to move the lug 13 to the left, Figure 2, under the ribs 6 and into the position in which it is shown in Figure 3. One of the ribs 6 is provided with a stop pin 22 to limit this rotation. Cover 10 may also be provided with a second indicating dot 23 which will be aligned with the dot 20 when the lug 13 bears against the stop pin 22, this dot serving to indicate to the housewife how far the cover is supposed to be rotated.

As will be seen in Figure 3 there is an appreciable clearance between the top surface of the lug 13 and the bottom surface of the rib 6 adjacent the stop pin and as a result the gasket 18 is not compressed by the movement of the cover into this locked position.

As will be seen in Figures 1 and 6, the gasket 18 contains a V-shape groove 25 opening into the interior of the vessel and dividing the gasket into two sealing lips 26 and 27 which are held against the sealing surfaces 15 and 3 respectively solely by the weight of the cover to form a seal which is sufficient to permit building up an initial small pressure in the cooker.

As heat is applied to the cooker and pressure built up in it that pressure will raise the cover to bring lug 13 into active engagement with the undermost surfaces of the ribs 6 and to force the sealing lips 26 and 27 outwardly into sealing engagement with their respective sealing surfaces. The gasket is supported by the flange in the areas between the recesss 17 therein and the wall thickness of the gasket between the bottom of the V-groove therein and the outside periphery thereof is made great enough to give sufficient strength to the gasket to prevent it from being forced outwardly into these recesses by normal operating pressures in the cooker. Safety valves such as 16 are normally arranged to hold pressure in the cooker up to about 15 pounds maximum and the sealing gasket may be readily made to hold against pressures of this value.

Sealing lips 26 and 27 of the gasket are exposed to the interior and will come in contact with oils and greases within the cooker during cooking of meats and the like, and in addition the entire gasket is subjected to the temperature of the cooker. There are many synthetic rubbers, Neoprene for example, which are impervious to oils and greases and are capable of withstanding the temperatures involved without damage, and the gasket is preferably composed of such material and maintained at a durometer hardness of from 50 to 55. When so made the gasket will maintain the cooker sealed at the normal operating pressure of 15 pounds, against which the gasket will hold tight in the areas where it is bridged across the recesses 17 in the flange.

The maximum pressure that these bridging sections of the gasket can withstand will depend upon the thickness of the wall between the bottom of the V-groove 25 and the outer periphery of the gasket and upon the length of the recesses 17. Preferably these dimensions are chosen so that the gasket will fail to maintain a seal when the pressure in the cooker reaches a value of 25 pounds.

Under normal operation as soon as the pressure in the cooker has been built up to the value for which the safety valve is set, that safety valve will become unseated to permit escape of steam from the cooker. Should a particle of food or other foreign object become lodged in the rather small orifice of the safety valve or should that valve fail to operate for any other reason, the pressure in the cooker will continue to rise and will soon reach a value higher than the unsupported wall sections of the gasket can withstand, with the result that the gasket will be blown outwardly into the recesses 17 in the manner shown in Figure 7. This outward movement of the gasket will move the sealing lip 27 thereof off of the sealing surface 3 to permit steam to escape as shown by the arrows 24 in Figure 7. Steam thus escaping strikes against the flange 12 and is deflected downwardly alongside the outer surfaces of the cooker carrying with it any particles of food or liquids that may be thus blown out of the cooker.

Since the lugs 13 do not actively engage the under surfaces of the ribs 6 during movement of the cover into and out of locking position, the surfaces of the lugs and ribs are not polished by repeated relative movements therebetween. Pressures of 15 pounds acting against the large under surfaces of the cover 10 urge that cover upwardly under considerable force, which upward movement is resisted by the relatively small areas of engagement between the lugs and ribs, with the result that the friction between these members serves to lock the cover in place on the cooker so tightly that it is impossible to rotate the cover with respect to the cooker while the cooker is under normal operating pressure. The engagement of the sealing lips of the gasket bearing against the sealing surfaces also aid in locking the cover in place. If desired the main locking areas on the undersides of the ribs 6 and on the lugs 13 may be serrated or otherwise roughened, however this has been found to be unnecessary.

When the housewife desires to open the cooker she releases the pressure therein either by lifting the safety valve off of its seat or by unscrewing the valve member thereon in the manner pointed out in the aforementioned Nelson application, and if the pressure drops to zero in the cooker, lugs 13 will assume the position in which they are shown in Figure 3 and the cover may be rotated to register these lugs with the passageways 7, as shown in Figure 2, permitting the cover to be raised from the cooker.

If for any reason pressure is not released in the cooker due to clogging of the orifice of the safety valve or failure of the housewife to leave the valve unseated until the pressure has completely escaped and the housewife attempts to open the cooker before the pressure has fallen to a safe amount, lugs 13 moving off of the locking portions of the ribs 6 will be forced by the pressure in the cooker into the recessed portion 30 in the undersurface of the ribs 6, as shown in Figure 5. The lug 13 will strike against the shoulder stop 31 thereby locking the cover against further rotation and preventing its removal until pressure has been completely released. When the lug moves into engagement with the bottom of the recesses 30 there will be an appreciable bang which should serve to notify the housewife that the pressure is not completely released so that she may take steps to release it to permit opening the cooker. As will be seen in Figure 6, when the lugs 13 are engaged with the bottoms of the recesses 30 in the ribs to form the auxiliary lock of the cover, the distance between sealing surfaces 3 and 15 will be greater than normal. Sealing lip 27 of the gasket will be forced down onto the sealing surface 3, however its area of engagement therewith will be small and the cooker will most likely lose pressure rapidly. This loss of pressure may be sufficient to unlock the cover without further action by the housewife, if not she must clear the orifice of the safety valve 16 before she can remove the cover. As soon as the pressure has been completely released lugs 13 will be pushed downwardly away from the shoulder stop 31 by the weight of the cover and the cover may then be rotated to register these lugs with the passageways in manner shown in Figure 2.

The improved cooker of my invention is possessed of many advantages. The arrangement of ribs and lugs permits placing the cover on the cooker and rotating it to locking position without compressing the gasket except by the weight of the cover, with the result that the gasket is not subjected to severe stresses and hence its life is lengthened. Small pressures in the cooker move the cover to locking position and the gasket to sealing position so that normal pressures may be built up within the cooker, which pressures positively lock the cover against accidental rotation. The gasket being unsupported in a plurality of regions releases excess pressure in the cooker before such pressure has attained dangerous proportions. Accidental unlocking of the cover while pressure still remains in the cooker is positively prevented, with the result that the cooker is much safer in the hands of inexperienced operators than the cookers of the prior art.

While I have chosen to illustrate my invention by showing and describing a preferred embodiment of it, I have done so by way of example only as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claim.

What is claimed is:

In a pressure cooker, a cooker body, a sealing surface on said body, a plurality of spaced apart ribs projecting radially outwardly from the cooker near said sealing surface, a lower surface on each rib disposed in two planes both of which are parallel to said sealing surface, the portion of said lower surface disposed in the upper one of said planes constituting an auxiliary lock and the portions in the lower one of said planes forming a lock and a shoulder stop disposed at the opposite ends of said auxiliary lock and connected thereto by walls disposed at right angles to said planes; a flanged cover, a sealing surface on said cover adjacent said flange, a plurality of spaced apart ribs projecting radially inwardly from the flange adapted to pass between adjacent ones of the ribs on the cooker; and a self-sealing gasket engaging said sealing surfaces and supporting the cover with said cover lugs disposed below and spaced from said lower one of said planes so that on rotation of the cover the ribs will pass beneath and in spaced relationship to the shoulder stop, auxiliary lock and lock, into alignment with the lock, said cover rising as pressure is built up in the cooker to register the cover ribs with the lock to secure the cover on the cooker, and said gasket maintaining a seal during said movement of the cover to permit working pressure to be built up in the cooker, said cover ribs snapping into engagement with the auxiliary locks when the cover is counter-rotated with some pressure in the cooker to break the seal and release said pressure.

CLIFTON O. STROM.

REFERENCES CITED

The following references are of record in the file of this patent:

UNITED STATES PATENTS

| Number | Name | Date |
|---|---|---|
| 1,887,700 | Stevens | Nov. 15, 1932 |
| 2,101,756 | Saunders et al. | Dec. 7, 1937 |
| 2,102,962 | Ludington | Dec. 21, 1937 |
| 2,198,125 | Nelson | Apr. 23, 1940 |
| 2,201,314 | Illsley | May 21, 1940 |
| 2,203,801 | Swank | June 11, 1940 |
| 2,218,188 | Wittenberg | Oct. 15, 1940 |
| 2,387,360 | Smith | Oct. 23, 1945 |
| 2,399,115 | Hansen et al. | Apr. 23, 1946 |

FOREIGN PATENTS

| Number | Country | Date |
|---|---|---|
| 595,332 | France | Sept. 30, 1925 |